UNITED STATES PATENT OFFICE.

HEINRICH KRIEGSHEIM, OF NEW YORK, N. Y., ASSIGNOR TO THE PERMUTIT COMPANY, OF NEW YORK, N. Y., A CORPORATION OF DELAWARE.

MANUFACTURE OF OXYGEN.

1,153,502.            Specification of Letters Patent.     Patented Sept. 14, 1915.

No Drawing.      Application filed November 17, 1914. Serial No. 872,526.

*To all whom it may concern:*

Be it known that I, HEINRICH KRIEGSHEIM, a subject of the German Emperor, residing at 30 East Forty-second street, city and county of New York, State of New York, have invented certain new and useful Improvements in Manufacture of Oxygen, of which the following is a specification.

This invention relates to the manufacture of oxygen; and it comprises a method of preparing oxygen with the aid of chlorin, which may be waste chlorin from any source, wherein such chlorin is absorbed in lime or lime water or any suitable alkaline material to make a corresponding hypochlorite, and the hypochlorite so made, or a hypochlorite made in any other way, in the form of a water solution is brought into contact with an exchange silicate, or reactive zeolite, containing a catalytic oxid, such as manganese oxid, nickel oxid, cobalt oxid, copper oxid, etc., to cause a catalytic decomposition with evolution of oxygen and formation of a chlorid corresponding to the hypochlorite used; all as more fully hereinafter set forth and as claimed.

The problem of obtaining oxygen in a cheap and convenient way is one of great industrial importance for many purposes. A cheap, convenient and productive source of oxygen is, for example, highly desirable in connection with autogeneous welding and many other processes wherein the oxygen of air is, so to speak, in too highly diluted a condition to serve. The many methods which have been proposed for producing oxygen by decomposition of highly oxygenated compounds, such as chlorates, manganese dioxid, barium peroxid, plumbates, etc., by heat are all expensive and inconvenient and have found little foothold in the arts. Producing oxygen from liquid air by distillation processes requires a cumbrous and expensive plant.

For technical purposes a much better and more convenient source is that afforded by the catalytic decomposition of hypochlorites; which hypochlorites may be, and advantageously are, obtained by the absorption of waste chlorin from any source in such an alkaline material as milk of lime. Hypochlorites in solution in contact with certain metallic oxids split up smoothly and completely into the corresponding chlorids and free oxygen; calcium hypochlorite (or bleaching powder), for example, when contacted in solution with cobalt oxid, yielding calcium chlorid and oxygen which escapes in the gaseous form. The reaction is purely catalytic, very small quantities of oxids sufficing to decompose relatively large amounts of hypochlorites and the oxids being found apparently unchanged at the end of the action. But the speed and completeness of the action depend very materially on the physical form of the oxid and upon the circumstances; upon the way in which the reaction mixture and the catalyst are brought together.

I have found that a very advantageous type of action for the present purposes is attained by using a compound catalyst formed from such catalytic bodies carried in what are known as exchange silicates or zeolites; the materials which are used for purifying water and other liquids by exchanging contained bases for those contained in such liquid. These silicates, which may be either natural or artificial but are more commonly of artificial origin, usually contain silica, alumina and alkali in combination and in a hydrated condition. The alkali may be potash or soda, or both. More rarely other amphoteric or weakly basic oxids, such as tin oxid, titanium oxid, etc., are used to replace part or all of the alumina. When artificially made, the zeolites may be prepared by various methods, such as fusion of various silicates, etc., to make melts of the correct composition, with subsequent granulation and hydration. Or the material may be made by wet methods. However prepared, the material is in the form of small, highly porous, hard and mechanically strong granules. Such material is mostly used for softening water. Upon treatment of water containing lime or magnesia salts with these granules the latter take up the lime and give up sodium or potassium which goes into solution as a salt of the acid formerly combined with the lime or magnesia. When the zeolites become charged with lime or magnesia they may be revivified by treatment with a solution of sodium chlorid whereupon the reverse reaction takes place and the granules are restored to their original state, ready for reuse. I have found that by impregnating this exchange material with salts of the catalytic metals I obtain a granular compound catalyst eminently suited for the stated purpose. For example, granules of one of the zeolites may be treated with a solution of sulfate, chlorid or nitrate of cobalt and after a time, to allow reaction to take place, the excess of the solution may be removed. Corresponding salts of nickel, manganese, copper or lead may be used; or their mixtures. But I find on the whole the cobalt, nickel and manganese salts to be best adapted. This granular compound catalytic material may be brought into contact with the hypochlorite solution, which is advantageously quite strong, in any suitable apparatus. The hypochlorite solution may be previously filtered. A relatively small quantity of catalyst suffices to produce a strong and vigorous evolution of oxygen which may be led off and collected, and which may be washed and dried, if desired. The decomposition of the hypochlorite is quantitative, an amount of oxygen corresponding to the amount of chlorin present being evolved. The particles of contact material may be enveloped by the gas bubbles to an extent preventing the desired intimate mixture of such material with the liquid. It is therefore advantageous to move the contact material intermittently or continuously by stirring or shaking to promote intimate contact of the prepared silicates and to prevent enveloping of the particles by gas bubbles. Toward the end of the action, the mixture may advantageously be raised in temperature somewhat. After completion of the action the solution of calcium chlorid or other chlorid produced by decomposition of the hypochlorite may be removed from the mass of granules of compound catalyst, and such catalyst is then ready for reuse. The solution may be caused to flow in continuous stream through a sufficiently thick layer of the silicates. In this method the compounds of the catalytic metals are presented for action in a state of the finest possible subdivision and have a maximum activity. This high activity may also probably be, in part at least, attributed to an influence of the carrier; the exchange silicate. The compound contact body does not lose in activity by repeated use. No disadvantageous by-products are formed and there is no waste of the catalyst. The reaction, or the greater part of it, may take place at the ordinary temperature. Ordinary bleaching powder dissolved or mixed with water may be used to afford the hypochlorite. Or electrically produced hypochlorites may be used.

The described method may be applied to the utilization of waste chlorin from any source, even if such chlorin be quite impure or highly diluted. The chlorin may be led into milk of lime as long as absorption takes place, the fluid obtained, with or without filtration, is contacted with the described compound contact body. Caustic soda solution and other alkaline solutions may also be used.

What I claim is:—

1. The process of making oxygen which comprises contacting a hypochlorite solution with an exchange silicate containing a catalytic metal compound and collecting the oxygen produced.

2. The process of making oxygen which comprises contacting a hypochlorite solution with an exchange silicate containing a cobalt compound and collecting the oxygen produced.

3. The process of making oxygen which comprises impregnating an exchange silicate with a solution of a salt of a catalytic metal, removing the excess of the solution, contacting the impregnated silicate with a hypochlorite solution and collecting the oxygen produced.

4. The process of making oxygen which comprises impregnating an exchange silicate with a solution of a cobalt salt, removing the excess of solution, contacting the impregnated silicate with a hypochlorite solution and collecting the oxygen produced.

5. The process of producing oxygen which comprises absorbing chlorin in an alkaline liquid, contacting such liquid with an exchange silicate containing a compound of a catalytic metal and collecting the oxygen produced.

6. The process of producing oxygen which comprises absorbing chlorin in milk of lime, contacting the liquid obtained with an exchange silicate containing a compound of a catalytic metal and collecting the oxygen produced.

7. The process of producing oxygen which comprises absorbing chlorin in milk of lime, contacting the liquid with an exchange silicate containing cobalt and collecting the oxygen produced.

8. The process of producing oxygen which comprises absorbing chlorin in milk of lime to produce a liquid containing hypochlorite, impregnating an exchange silicate with a salt of a catalytic metal, contacting the impregnated silicate with the liquid and collecting the oxygen produced.

9. The process of making oxygen which comprises contacting a hypochlorite solution with an exchange silicate containing a catalytic compound, and agitating the silicate to quickly remove gas bubbles and to promote intimate contact of the liquid with the silicate.

In testimony whereof, I affix my signature in the presence of two subscribing witnesses.

HEINRICH KRIEGSHEIM.

Witnesses:
MAURICE P. STACK,
ALFRED M. HOUGHTON.